United States Patent [19]

Yagi et al.

[11] 4,427,832

[45] Jan. 24, 1984

[54] THERMOPLASTIC RESIN COMPOSITIONS

[75] Inventors: Norio Yagi, Atsugi; Hisashi Chiba; Yutaka Mitsuda, both of Machida; Yasuaki Sakano, Ichihara; Masaki Aikawa, Funabashi, all of Japan

[73] Assignee: Denki Kagaku Kogyo Kabushiki Kaisha, Tokyo, Japan

[21] Appl. No.: 284,163

[22] Filed: Jul. 17, 1981

[51] Int. Cl.³ .................. C08F 212/06; C08F 212/10
[52] U.S. Cl. ..................................... 525/238; 525/72; 525/80; 525/86; 526/78; 526/262; 526/284; 526/298; 526/317; 526/329.2; 526/342
[58] Field of Search ................ 526/78, 262, 284, 298, 526/317, 329.2, 342; 525/72, 80, 86, 238

[56] References Cited

U.S. PATENT DOCUMENTS

| | | | |
|---|---|---|---|
| 2,559,155 | 7/1951 | Chapin et al. | 526/78 |
| 2,646,417 | 7/1953 | Jennings | 525/238 |
| 3,149,183 | 9/1964 | Salyer et al. | 525/238 |
| 3,424,823 | 1/1969 | Hall et al. | 525/238 |
| 3,547,857 | 12/1970 | Murray | 526/342 |
| 3,956,246 | 5/1976 | Griffith et al. | 526/342 |
| 4,002,812 | 1/1977 | Hendy | 526/342 |
| 4,060,680 | 11/1977 | Hendy | 526/342 |
| 4,294,946 | 10/1981 | Minematsu et al. | 526/342 |

*Primary Examiner*—Harry Wong, Jr.
*Attorney, Agent, or Firm*—Sughrue, Mion, Zinn, Macpeak & Seas

[57] ABSTRACT

In the emulsion polymerization of a monomer mixture comprising an aromatic vinyl compound, a vinyl cyanide compound and if desired, other vinyl compounds copolymerizable therewith in an aqueous medium, the vinyl cyanide compound is further added to the polymerization system in a controlled velocity during the substantial period of polymerization from the initial stage. When the copolymer thus obtained is incorporated into, for example, an acrylonitrile-butadiene-styrene terpolymer composition, thermoplastic resin compositions not coloring upon molding are obtained with a good impact resistance and heat resistance.

9 Claims, No Drawings

THERMOPLASTIC RESIN COMPOSITIONS

BACKGROUND OF THE INVENTION

This invention relates to an improved process for the preparation of copolymers comprising an aromatic vinyl compound, a vinyl cyanide compound and if desired, other vinyl compounds copolymerizable therewith and a thermoplastic resin composition containing such copolymers.

For improving a molding processability of thermoplastic resin compositions and elevating the thermal deformation temperature, there have, hitherto, been provided processes for the copolymerization of a monomer mixture mainly comprising an aromatic vinyl compound and a vinyl cyanide compound wherein the vinyl cyanide compound and/or aromatic vinyl compound are further added in the latter stage of polymerization (e.g. Japanese Patent Publications No. 45-33661 and No. 47-46472).

However, copolymers obtained by these processes have a wide distribution in the molecular weight and polymer composition, colour upon the molding processing and are insufficient in the impact resistance and heat resistance. Thus, when these copolymers are incorporated into, for example an acrylonitrile-butadiene-styrene terpolymer composition (hereinafter referred to as ABS resin), a thermoplastic resin composition not colouring upon the molding processing cannot be obtained with a good impact resistance and heat resistance.

Particularly, in case copolymers obtained in the process of further adding the vinyl cyanide compound in the latter stage of polymerization are incorporated into the ABS resin, the colouration upon the molding processing is remarkable.

SUMMARY OF THE INVENTION

An object of this invention is to provide a process for the preparation of copolymers starting from a monomer mixture mainly comprising an aromatic vinyl compound and a vinyl cyanide compound, not colouring upon the molding processing and having a good impact resistance and heat resistance.

Another object of this invention is to provide an ABS resin having the above copolymer incorporated thereinto to obtain a thermoplastic resin composition not colouring upon the molding and having a good impact resistance and heat resistance.

In accordance with this invention, there is provided a process for the preparation of copolymers by the emulsion polymerization of a monomer mixture comprising an aromatic vinyl compound, a vinyl cyanide compound and if desired, other vinyl compounds copolymerizable therewith in an aqueous medium, which comprises further adding the vinyl cyanide compound to the polymerization system during the substantial period of polymerization from the initial stage and maintaining a proportion of unreacted monomers present in the polymerization system during the rate of polymerization of 0~90% by weight to be such that a molar ratio of the total of the aromatic vinyl compound and the above copolymerizable vinyl compound to the vinyl cyanide compound is within the range of from 1.3 to 3.

DETAILED DESCRIPTION OF THE INVENTION

The aromatic vinyl compounds which may be used in this invention are, for example, α-methylstyrene (hereinafter referred to as αMSM), styrene (hereinafter referred to as SM), vinyltoluene, t-butylstyrene and a halogen-substituted styrene.

The vinyl cyanide compound which may be used are, for example, acrylonitrile (hereinafter referred to as AN), methacrylonitrile, α-chloroacrylonitrile and others.

Also, other vinyl compounds copolymerizable with the aromatic vinyl compound and the vinyl cyanide compound are selected from, for example, known various vinyl monomers such as acenaphthylene, fumaronitrile, maleimide, N-substituted maleimides, methacrylic acid, acrylic acid, methacrylic acid esters and acrylic acid esters. They may be used alone or in mixture of two or more.

The proportion of the monomer mixture is, preferably, such that the aromatic vinyl compound is 65~80% by weight, the vinyl cyanide compound is 15~30% by weight and the copolymerizable other vinyl compounds are 0~20% by weight.

One of the most important features of this invention is that the proportion of unreacted monomers present in the polymerization system during the substantial period of polymerization is maintained such that the molar ratio of the total of the aromatic vinyl compound and the copolymerizable other vinyl compounds to the vinyl cyanide compound is within the range of 1.3~3, preferably 1.7~2.5. When the molar ratio exceeds 3, it is difficult to obtain a polymer of high molecular weight and the polymer obtained is insufficient in impact resistance and also, owing to reduced polymerization velocity it is very difficult to obtain polymers with a high yield. On the other hand, when the molar ratio is less than 1.3, the resulting polymer colours upon the molding processing and also the heat resistance is reduced.

Addition of the vinyl cyanide compound to the polymerization system during the substantial period of polymerization may be effected continuously or intermittently. Preferably, the vinyl cyanide compound is continuously added dropwise. An amount of water which is used as a medium for the emulsion polymerization according to this invention is within the range of 100~500 parts, preferably 150~250 parts by weight based on 100 parts by weight of the monomer mixture. If the amount of water is too little, the stability of the resulting emulsion is lowered and the removal of the polymerization heat becomes difficult. On the other hand, if the amount of water is too much, an efficiency of production of copolymer is reduced.

As for a water-soluble radical catalyst, which may be used in this invention, there are exemplified persulfates, for example, potassium persulfate, sodium persulfate and ammonium persulfate.

Examples of an emulsifier are a metal salt of alkylbenzenesulfonic acid such as sodium dodecylbenzenesulfonate (hereinafter referred to as DBSN) and potassium dodecylbenzenesulfonate, a metal salt of fatty acids such as sodium or potassium stearate and sodium or potassium oleate and lauric acid esters, and other conventional emulsifiers.

To the polymerization system there may be added a molecular weight modifier such as t-dodecylmercaptane, an emulsifier assistant such as sodium naphthalenesulfonate, a lubricant such as an aliphatic acid amide and other additives which are used conventionally. The emulsion polymerization may be carried out, in general, at temperatures of 30°~100° C., preferably 50°~75° C.

The emulsion obtained by the above process is treated in a conventional method, for example by coagulating with a coagulant such as calcium chloride, washing dehydrating and drying to obtain a powdery white polymer.

Copolymers thus obtained do not colour upon the molding and have a good impact resistance and heat resistance and therefore, are useful as a thermoplastic resin.

In another aspect of this invention, a thermoplastic resin composition not colouring upon the molding and having a good impact resistance and heat resistance is obtained by incorporating the above-mentioned copolymer into, for example, ABS resins, an acrylonitrile/ethylene.propylene.diene rubber/styrene copolymer composition (AES resins), an acrylonitrile/chlorosulfonated polyethylene/styrene copolymer composition (ACS resins), an acrylonitrile/acrylic rubber/styrene copolymer composition (AAS resins) or vinyl chloride polymers.

The ABS resin includes a composition having a vinyl cyanide compound (e.g. acrylonitrile) and an aromatic vinyl compound (e.g. styrene) grafted to polybutadiene or butadiene copolymers containing 50% by weight or more butadiene and having a weight average particle size of 100~800 mμ and a composition consisting of the above grafted polymer and a styrene/acrylonitrile copolymer (SAN resin). The ABS resin is composed of 30~100% by weight of the grafted polymer and 0~70% by weight of the SAN resin. The grafted polymer is composed of 10~70% by weight of the rubber component, 5~80% by weight of the vinyl cyanide and 10~80% by weight of the aromatic vinyl compound. The SAN resin is composed of 65~80% by weight of styrene and 20~35% by weight of acrylonitrile.

For preparing thermoplastic resin compositions the copolymer of this invention and the above-mentioned resin are mixed and pelletized, for example by means of a conventional extruder. The mixing proportion of the copolymer is within the range of 10~90% by weight relative to the thermoplastic resin composition.

Also, a resin composition with improved heat resistance and impact resistance is obtained by incorporating 10~80% by weight of the above thermoplastic composition and 20~90% by weight of vinyl chloride resins.

This invention will be illustrated by the following non-limitative examples.

EXAMPLE 1

The following materials were added to a 1.0 l autoclave of glass provided with a stirrer while feeding gaseous nitrogen:

|  | Parts by weight (g) |
| --- | --- |
| αMSM | 210 |
| SM | 15 |
| AN | 45 |
| 20% aqueous solution of DBSN | 37.5 |
| Potassium chloride | 0.15 |
| t-Dodecylmercaptane | 1.5 |
| Water | 640 |

The autoclave was heated, the contents were elevated to temperature of 70° C. and then 20 ml of a 1.0% aqueous solution of potassium persulfate were added to commence polymerization. After six hours 10 ml of the same aqueous solution were added again. The rate of polymerization one hour after the beginning of polymerization was 12.3% by weight. At this time 30 g as the total of AN were further added in a velocity of 5.0 g/hour over six hours using a micro determination pump. In the course of polymerization several ml of the emulsion were sampled to observe the rate of polymerization and the proportion of unreacted monomers. The polymerization was discontinued after ten hours. The rate of polymerization at that time was 96.8% by weight. The emulsion sampled in the course of polymerization was analyzed by gas chromatography. The results obtained are set forth in Table 1.

TABLE 1

| Polymerization Hour (hr) | Rate of Polymerization (% by weight) | Molar Ratio of Unreacted Monomers (αMSM + SM)/AN |
| --- | --- | --- |
| 0 | 0 | 2.3 |
| 1 | 12.3 | 2.4 |
| 3 | 37.7 | 2.2 |
| 5 | 61.3 | 2.2 |
| 7 | 86.6 | 2.2 |
| 10 | 96.8 | 2.0 |

The emulsion thus obtained was coagulated by calcium chloride, washed, dehydrated and dried. Thus, a powdery white polymer (1) was obtained.

On the other hand a grafted polymer (2) (ABS resin) was obtained by subjecting 150 parts by weight of a mixture of SM and AN (SM/AN 70:30 in weight) to emulsion polymerization in 100 parts by weight as a solid of polybutadiene latex having a weight average particle size of 350 mμ in the presence of a radical initiator.

60 parts by weight of the above polymer (1) and 40 parts by weight of the grafted polymer (2) were blended to obtain a resin composition having a polybutadiene content of 16% by weight. Next, the resin composition was pelletized and then, was subject to injection molding with use of an injection molding machine (Allrounder 150 U Type, manufactured by ARBURG Maschinenfabrik Hehl & Söhne) at 260° C. and physical properties of the moldings were measured. The results obtained are set forth in Table 4.

REFERENCE EXAMPLE 1

The following materials were added to the same autoclave as in Example 1 while feeding gaseous nitrogen.

|  | Parts by weight |
| --- | --- |
| αMSM | 210 |
| SM | 15 |
| AN | 60 |
| 20% aqueous solution of DBSN | 37.5 |
| Potassium chloride | 0.15 |
| t-Dodecylmercaptane | 1.5 |
| Water | 640 |

Polymerization was carried out in the same procedure as in Example 1 except further adding 15 g of AN in a velocity of 15 g/hour over one hour after seven hours from the beginning of polymerization. The rate of polymerization and the molar ratio of unreacted monomers were observed as set forth in Table 2.

TABLE 2

| Polymerization Hour (hr) | Rate of Polymerization (% by weight) | Molar Ratio of Unreacted Monomers (αMSM + SM)/AN |
| --- | --- | --- |
| 0 | 0 | 1.7 |
| 1 | 18.5 | 1.9 |
| 3 | 46.8 | 2.0 |
| 5 | 70.1 | 2.4 |
| 7 | 82.0 | 3.5 |
| 10 | 97.2 | 0.5 |

The emulsion thus obtained was treated in the same manner as in Example 1 to obtain a powdery polymer. The powdery polymer was blended with the ABS resin like Example 1. The injection moldings of the ABS resin composition were tested in respect of physical properties. The results are set forth in Table 4.

EXAMPLE 2

Example 1 was repeated except using 15 g of methacrylic acid instead of SM.

EXAMPLE 3

Example 1 was repeated except using 15 g of N-phenylmaleimide instead of SM.

EXAMPLE 4

The following materials were added to the same autoclave as in Example 1 while feeding gaseous nitrogen:

| | Parts by weight |
| --- | --- |
| αMSM | 222 |
| AN | 40 |
| 20% aqueous solution of DBSN | 37.5 |
| Potassium chloride | 0.15 |
| t-Dodecylmercaptane | 1.5 |
| Water | 640 |

The polymerization was carried out in accordance with the procedure of Example 1 provided that 20 ml of a 1.0% aqueous solution of potassium persulfate were added to commence polymerization and immediately, 38 g of AN were further added in a velocity of about 5.43 g/hour over seven hours from the beginning of polymerization.

TABLE 3

| Polymerization Hour (hr) | Rate of Polymerization (% by weight) | Molar Ratio of Unreacted Monomers [(αMSM + SM)/AN] |
| --- | --- | --- |
| 0 | 0 | 2.5 |
| 1 | 12.5 | 2.4 |
| 3 | 37.0 | 2.3 |
| 5 | 59.2 | 2.3 |
| 7 | 81.0 | 2.2 |
| 10 | 96.6 | 1.8 |

The emulsion thus obtained was treated in the same procedure as in Example 1 and incorporated into the ABS resin and the injection moldings of the ABS resin composition were tested in respect of physical properties. The results are set forth in Table 4.

EXAMPLE 5

30 parts by weight of the powdery polymer (1) obtained in Example 1 and 70 parts by weight of AES resin (JSR AES-110, the tradename by Nihon Gosei Gomu K.K.) were blended and pelletized, followed by injection molding in the same manner as in Example 1 and physical properties of the moldings were measured. The results are set forth in Table 4.

For control the AES resin alone was subject to injection molding likewise and physical properties of the moldings were measured. The results are set forth in Table 4.

REFERENCE EXAMPLE 2

The procedure of Example 5 was repeated except using the powdery polymer obtained in Reference Example 1 and physical properties of the moldings were measured. The results are set forth in Table 4.

TABLE 4

| | Example 1 | Ref. Ex. 1 | Example 2 | Example 3 | Example 4 | Example 5 | Control | Ref. Ex. 2 |
| --- | --- | --- | --- | --- | --- | --- | --- | --- |
| Heat Deflection Temperature, °C. (*1) | 115 | 111 | 122 | 124 | 118 | 95 | 88 | 92 |
| Vicat Softening Point, °C. (*2) | 123 | 115 | 130 | 133 | 126 | 109 | 101 | 105 |
| Izod Impact Strength Kg.cm/cm.notch (*3) | 18 | 10 | 14 | 17 | 17 | 24 | 32 | 20 |
| Falling Plumb Impact Strength, Kg.cm (*4) | 100 | 45 | 80 | 85 | 90 | 150< | 150< | 130 |
| Colouration of Moldings (*5) | Non | Coloured | Non | Non | Non | Non | Non | Coloured |

(*1) Measured in accordance with ASTM D648-56 (18.6 Kg/cm$^2$)
(*2) Measured in accordance with ASTM D1525 (5 Kg weight)
(*3) Measured in accordance with ASTM D256-56 (¼ inch, at 20° C.)
(*4) An iron plumb of 1 Kg in weight having a hemisphere of 1.0 cm in diameter fixed at its bottom is allowed to fall on a sheet of 12 cm × 12 cm × 0.2 cm obtained by injection molding and the maximum height at which no breakage takes place is measured.
(*5) Observed with the naked eye in respect of a test sample obtained by injection molding at 260° C.

EXAMPLE 6

Pellets composed of the powdery polymer (1) and ABS resin (2) obtained in Example 1 (hereinafter referred to as a heat-resistance imparting agent) were blended with a vinyl chloride resin and additives as indicated hereunder and were subject to press molding. Physical properties of the moldings were measured.

For control a formulation not containing the heat-resistance imparting agent was subject to press molding likewise and physical properties of the moldings were measured.

| Formulation | Parts by weight |
| --- | --- |
| Vinyl chloride Resin (Denka | 100 |

| Formulation | Parts by weight |
| --- | --- |
| Vinyl SS-Y, the tradename by Denki Kagaku Kogyo K.K.) Heat-Resistance Imparting Agent | 40 |
| Octyltin Maleate (TM-188J, the tradename by Katsuta Kako K.K.) | 1.5 |
| Composite Lubricant (GH-4, the tradename by Henkel Ltd.) | 1.0 |
| Lubricant (OP-WAX, the tradename by Hoechst) | 0.2 |

Blending and Molding

To a 10.0 l Henschel mixer were added the vinyl chloride resin, the heat-resistance imparting agent, the composite lubricant and the lubricant in amounts as indicated in the above formulation and were elevated to 75° C. while stirring. The octyltin maleate was added at 75° C. and elevated to 120° C. Thereafter the blend was cooled and kneaded by means of a 10 inch roller at 180° C. for 5 minutes to form a sheet. Next, the sheet was cut to a mold size and was subject to press molding. Physical properties of the moldings were measured. The results are set forth in Table 5.

REFERENCE EXAMPLE 3

The procedure of Example 6 was repeated except using pellets composed of the powdery polymer obtained in Reference Example 1 and the ABS resin and physical properties of the moldings were measured. The results are set forth in Table 5.

TABLE 5

|  | Control | Example 6 | Ref. Example 3 |
| --- | --- | --- | --- |
| Heat Deflection Temperature, °C. (*1) | 67 | 78 | 74 |
| Vicat Softening Point, °C. (*2) | 79 | 88 | 85 |
| Izod Impact Strength Kg.cm/cm notch (*3) | 3.1 | 6.1 | 4.8 |
| Coloration of Moldings (*4) | Non | Non | Coloured |

(*1) Measured in accordance with ASTM D648-56 (18.6 Kg/cm$^2$)
(*2) In accordance with JIS K-6740
(*3) In accordance with JIS K-6740
(*4) Observed with the naked eye in respect of a sheet of 6 mm in thickness obtained by press molding at 180° C.

What is claimed is:

1. A process for the preparation of copolymers by the emulsion polymerization of a monomer mixture comprising 65 to 80% by weight of α-methylstyrene, 15 to 30% by weight of a vinyl cyanide compound and 0 to 20% by weight of other vinyl compounds copolymerizable therewith in an aqueous medium, which comprises carrying out the polymerization in one stage of polymerization while initiating the polymerization in the presence of the whole amount of α-methylstyrene and a partial amount of the vinyl cyanide compound, adding the residual amount of the vinyl cyanide compound continuously or intermittently in the course of the polymerization from initial stage up to termination of the polymerization and maintaining a proportion of unreacted monomers present during substantially the entire time of the polymerization to be such that a molar ratio of the total of α-methylstyrene and the copolymerizable vinyl compound to the vinyl cyanide compound is within the range of 1.3 to 3.0.

2. The process of claim 1 wherein the vinyl cyanide compound is acrylonitrile, methacrylonitrile or a mixture thereof.

3. The process of claim 1 wherein the vinyl cyanide compound is added continuously during substantially the entire time of polymerization from the initial stage up to termination of polymerization.

4. The process of claim 1 wherein the copolymerizable vinyl compound is an aromatic vinyl compound.

5. The process of claim 1 wherein the copolymerizable vinyl compound is styrene.

6. The process of claim 1 wherein the copolymerizable vinyl compound is methacrylic acid.

7. The process of claim 1 wherein the copolymerizable vinyl compound is N-phenylmaleimide.

8. A thermoplastic resin composition which comprises (A) 10~90% by weight of the copolymer obtained by the process of claim 1 and (B) 10~90% by weight of a polymer composition selected from the group consisting of an acrylonitrile/butadiene/styrene polymer composition, an acrylonitrile/ethylene.propylene.diene rubber/styrene polymer composition, an acrylonitrile/chlorosulfonated polyethylene/styrene polymer composition, an acrylonitrile/acrylic rubber/styrene polymer composition and a vinyl chloride polymer composition, said (A) and (B) forming 100% by weight of said thermoplastic resin composition.

9. A heat resistance and impact resistance resin composition comprising (C) 10~80% by weight of the composition of claim 8 and (D) 20~90% by weight of a vinyl chloride polymer composition, said (C) and (D) forming 100% by weight of said resin composition.

* * * * *